(12) United States Patent
Barr

(10) Patent No.: US 9,328,283 B2
(45) Date of Patent: May 3, 2016

(54) PREVENTION OF GAS HYDRATES FORMATION IN BOP FLUIDS IN DEEP WATER OPERATIONS

(71) Applicant: Transocean Sedco Forex Ventures Limited, George Town Grand Cayman (KY)

(72) Inventor: Aaron Barr, Houston, TX (US)

(73) Assignee: TRANSOCEAN SEDCO FOREX VENTURES LIMITED, Grand Cayman (KY)

(*) Notice: Subject to any disclaimer, the term of this patent is extended or adjusted under 35 U.S.C. 154(b) by 0 days.

(21) Appl. No.: 14/526,305

(22) Filed: Oct. 28, 2014

(65) Prior Publication Data

US 2015/0114655 A1  Apr. 30, 2015

Related U.S. Application Data

(60) Provisional application No. 61/897,727, filed on Oct. 30, 2013.

(51) Int. Cl.
*E21B 33/06* (2006.01)
*E21B 33/064* (2006.01)
*C09K 8/52* (2006.01)

(52) U.S. Cl.
CPC .............. *C09K 8/52* (2013.01); *C09K 2208/22* (2013.01)

(58) Field of Classification Search
CPC ... E21B 33/06; E21B 33/064; E21B 41/0007; C09K 8/524; C09K 8/52; C09K 2208/22
USPC ............. 166/335, 337, 363, 368, 304; 507/90
See application file for complete search history.

(56) References Cited

U.S. PATENT DOCUMENTS

| | | | | |
|---|---|---|---|---|
| 4,470,918 | A * | 9/1984 | Mosier | 252/77 |
| 5,639,925 | A * | 6/1997 | Sloan, Jr. | C09K 8/52 137/13 |
| 5,880,319 | A * | 3/1999 | Sloan, Jr. | C09K 8/52 137/13 |
| 6,025,302 | A * | 2/2000 | Pakulski | C09K 8/52 507/90 |
| 6,177,497 | B1* | 1/2001 | Klug | C09K 8/52 524/376 |
| 7,968,500 | B2* | 6/2011 | Pakulski | C09K 8/52 166/304 |
| 2002/0100589 | A1* | 8/2002 | Childers | E21B 33/0355 166/339 |
| 2005/0155658 | A1* | 7/2005 | White | 138/31 |
| 2007/0078068 | A1* | 4/2007 | Askew | 508/428 |
| 2007/0286745 | A1* | 12/2007 | Chance | 417/397 |
| 2009/0036331 | A1* | 2/2009 | Smith | 507/138 |
| 2010/0000208 | A1* | 1/2010 | McKechnie et al. | 60/327 |
| 2010/0016186 | A1* | 1/2010 | Smith | 508/158 |
| 2011/0147002 | A1* | 6/2011 | Kotrla et al. | 166/363 |

(Continued)

OTHER PUBLICATIONS

McPhaden, "NODC Electronic Data Documentation Form", National Oceanic Data Center, <http://www.nodc.noaa.gov/archive/arc0001/000003/1.1/data/0-data/>, Dec. 14, 1999, accessed Dec. 7, 2012, 4 pages.
Sander, "NIST Standard Reference Data—Nitrogen", 2011, <http://webbook.nist.gov/cgi/cbook.cgi?ID=C7727379&Units=SI&Mask=10#copyright>, accessed Dec. 9, 2012, 3 pages.

(Continued)

*Primary Examiner* — Matthew R Buck
(74) *Attorney, Agent, or Firm* — Norton Rose Fulbright US LLP

(57) ABSTRACT

The present invention is directed to a method for preventing gas hydrates formation in BOP fluids in deep water well operations that includes the step of adding at least 28% glycol by volume to a BOP fluid, whereby the hydrate phase equilibrium line shifts to the point where the operating conditions will not form a hydrate.

16 Claims, 10 Drawing Sheets

(56) References Cited

U.S. PATENT DOCUMENTS

| | | | |
|---|---|---|---|
| 2012/0073826 A1* | 3/2012 | Miller | 166/373 |
| 2012/0111572 A1* | 5/2012 | Cargol, Jr. | E21B 33/0355 |
| | | | 166/363 |
| 2013/0061937 A1* | 3/2013 | Nellessen et al. | 137/14 |
| 2013/0062069 A1* | 3/2013 | Du | 166/335 |
| 2013/0074687 A1* | 3/2013 | Nellessen | 92/142 |
| 2013/0112420 A1* | 5/2013 | Bisset | 166/344 |
| 2013/0269947 A1* | 10/2013 | Shilling | E21B 17/015 |
| | | | 166/345 |
| 2014/0034337 A1* | 2/2014 | Van Wijk | 166/387 |
| 2014/0064029 A1* | 3/2014 | Jaffrey | 367/81 |
| 2015/0021038 A1* | 1/2015 | Shafer et al. | 166/363 |

OTHER PUBLICATIONS

Span et al., "A Reference Equation of State for the Thermodynamic Properties of Nitrogen for Temperatures from 63.151 to 1000 K and Pressures to 2200 MPa", Journal of Physical Chemistry Reference Data 29, No. 6, 2000, pp. 1361-1433.

Tohidi et al., "Improving the Accuracy of Gas Hydrate Dissociation Point Measurements", Annals of the New York Academy of Science, 2000, pp. 924-931.

Wagner et al., "The IAPWS Formulation 1995 for the Thermodynamic Properties of Ordinary Water Substance for General and Scientific Use", Journal of Physical Chemistry Reference Data 31, No. 2, 2002, pp. 387-535.

* cited by examiner

| Temperature °C ±0.2 | Pressure psia ±7 |
|---|---|
| -8.7 | 3,096 |
| 0.0 | 6,802 |
| 6.5 | 11,815 |

PREVENTION OF GAS HYDRATES FORMATION IN BOP FLUIDS IN DEEP WATER OPERATIONS

CROSS-REFERENCE TO RELATED APPLICATION

This application claims the benefit of U.S. Provisional Application 61/897,727 filed on Oct. 30, 2013, which is incorporated by reference in its entirety.

TECHNICAL FIELD

This invention relates to the field of deep sea drilling. More particularly, this invention relates to methods and compositions for the prevention of gas hydrate formation within deep water hydraulic systems.

BACKGROUND OF THE INVENTION

A clathrate is a chemical substance consisting of a lattice that traps or contains molecules. Clathrates, or gas hydrates, are crystalline water-based solids in which small non-polar molecules (typically gases) are trapped inside "cages" of hydrogen bonded, frozen water molecules. Gas hydrates are found in Arctic and Antarctic ice sheets, where air trapped within snow becomes a stable (air) gas hydrate at high-depth and low-temperature conditions. Nitrogen gas and water can form a nitrogen gas hydrate in which a large amount of nitrogen is trapped within a crystallized water lattice.

Gas hydrates are typically stable under low-temperature and high-pressure conditions. Gas hydrate formation is problematic for the oil and gas industry in deep water drilling operations, owing to low temperature and high pressure conditions that favor the formation of gas hydrates.

For example, the National Oceanic and Atmospheric Administration (NOAA) provides ocean temperatures at depth for various locations in the Pacific Ocean as well as other locations (McPhaden 1999). Typically, ocean depth can be divided into three vertical layers. The top layer is the surface layer, or mixed layer. Water temperature is highest in the surface layer, and is easily influenced by solar energy, wind, and rain. The next layer is the thermocline, where water temperature drops rapidly as the depth increases. The lowest layer is the deep-water layer. Water temperature in this zone decreases slowly as depth increases. Water temperature in the deepest parts of the ocean averages about 36° F. (2° C.).

Hydrostatic pressure at depth h beyond the water's surface is given by the formula $p=p_o+\rho \cdot g \cdot h$, where $p_o$ is atmospheric pressure at sea level, $\rho$ is the density of water, and g is gravitational acceleration. In order to operate at drilling depths, BOP control systems are designed to operate against extreme hydrostatic pressures. BOP accumulators are charged with up to 10,000 pounds per square inch (psi) of gas, typically nitrogen gas, to provide hydraulic actuating force for BOP control systems. In some examples, BOP control system pressure is 3,000 psi+the hydrostatic pressure of the seawater above it.

Gas hydrates may unexpectedly form within BOP control fluid at the temperature and pressures encountered by BOPs in deep water drilling operations. Gas hydrate formation is exacerbated when drilling in colder arctic waters, which occurs at temperatures near the freezing point of water. Nitrogen gas hydrate formation in subsea BOP control systems is believed to be the result of nitrogen gas entrapped in the tubing, or escaped from the subsea accumulator bottles. The formation of nitrogen gas hydrates, or nitrogen hydrates, in the control system of a BOP is consistent with the loss of control of the BOP. There is a need in the industry for methods and compositions to prevent the formation of gas hydrates within BOP control systems.

BRIEF DESCRIPTION OF THE DRAWINGS

For a more complete understanding of the present invention, reference is now made to the following descriptions taken in conjunction with the accompanying drawing, in which.

BRIEF SUMMARY OF THE INVENTION

Figure 1:
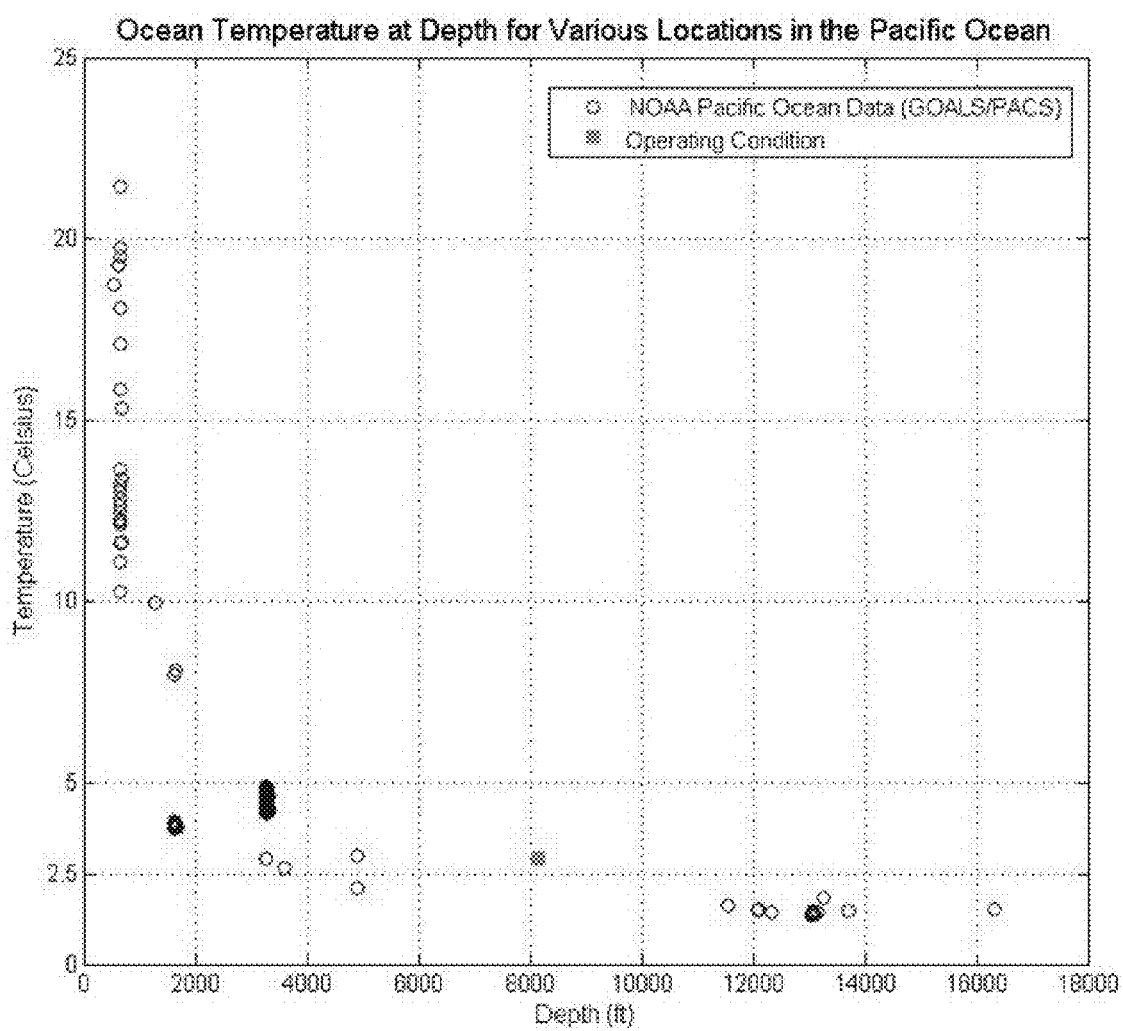
FIG. 1 is a graph illustrating ocean temperature at depth for various locations in the Pacific Ocean. A BOP control system operating condition is superimposed (Operating Point, filled square)

The present invention is directed to method and compositions for preventing the formation of gas hydrates in BOP fluids in deep water well operations. The method comprises the step of adding at least 28% by volume of an alcohol to a BOP fluid to give a hydrate-resistant BOP fluid. The alcohol is selected from the group consisting of monoethylene glycol, propylene glycol, glycerol, methanol, and a mixture thereof. Deep water well operations include drilling operations that occur below the surface of water.

A hydrate phase equilibrium line divides a BOP fluid's pressure-temperature graph into a region that favors the formation of gas hydrates and a region that does not favor the formation of gas hydrates. Addition of at least 28% by volume of an alcohol to a BOP fluid shifts the hydrate phase equilibrium line to a state where a hydrate will not form under a given set of operating conditions. In some embodiments, addition of at least 28% by volume of an alcohol to a BOP fluid reduces the temperature of the BOP fluid's hydrate phase equilibrium boundary approximately 10° C. for a given pressure. In some embodiments, 30% by volume of an alcohol is added to the BOP fluid. In embodiments, addition of an alcohol to a BOP fluid protects the BOP fluid against freezing.

In embodiments, BOP fluid comprises water and one or more fluid concentrate additives. Water may be selected from deionized water, sea water, rig potable water, and other types of water available to those of skill in the art. Fluid concentrate additives comprise one or more salts, lubricity components, e.g., mineral oils, vegetable oils, synthetic hydrocarbon oils, synthetic silicon-based oils, phospholipids, and mixtures thereof, antifreeze components, anti-corrosion components, bacterial and/or fungal growth inhibitors, elastomer compatibility components, and other components that affect fluid physical properties, such as pour point, viscosity, pH and specific gravity. In one embodiment, a hydrate-resistant BOP fluid comprises 5% by volume of a fluid concentrate additive, at least 28% by volume of an alcohol, and a balance of rig potable water. In one embodiment, a hydrate-resistant BOP fluid comprises 5% by mass of a fluid concentrate additive, at least 28% by mass of an alcohol, and a balance of rig potable water.

A method for preventing gas hydrate formation in BOP fluids in deep water well operations is described, comprising the step selected from the group consisting of: verification of stack mounted accumulator seals on a BOP, addition of at least 28% by volume of an alcohol to BOP fluid, addition of another inhibitor to the BOP fluid, the replacement of nitrogen with helium or neon as the accumulator working gas, and monitoring the BOP control system to determine if a leak has occurred and initiate a countdown.

A hydrate-resistant BOP fluid comprises water and at least 28% by volume of an alcohol. The alcohol may be selected from the group consisting of monoethylene glycol, propylene glycol, glycerol, methanol, and a mixture thereof. In some embodiments, a hydrate-resistant BOP fluid comprises water and at least 28% by volume of an alcohol. In further embodiments, a hydrate-resistant BOP fluid comprises water and at least 28% by mass of an alcohol.

As used herein the specification, "a" or "an" may mean one or more. As used herein in the claim(s), when used in conjunction with the word "comprising", the words "a" or "an" may mean one or more than one. The terms "BOP fluid", and "BOP control system hydraulic fluid" are used interchangeably herein.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" may mean at least a second or more.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

A study of a BOP control system malfunction identified the cause as icing/crystallization of the hydraulic fluid. ROV noted some isolated frost-like substance on the exterior surface of several hoses and fittings as well as along the framework below the Super Shear Ram and on the intermediate flange. There was also a formation of an ice-like substance originating from the solenoid pilot vent tube when flowing from the vented solenoid. It was noted that all areas exhibiting this frost had some type of fluid leak near the observed frost location when the system was pressured up on surface. Further analysis determined that the icing/crystallization was gas hydrates resulting in the BOP control system fluid.

As discussed above, FIG. 1 shows the seawater temperature at depth for various locations in the Pacific Ocean. The seawater surface temperature varies from 21° C. to near 10° C. within the first 1,000 ft. Seawater temperatures decrease quickly in depths beyond 1,000 ft. Temperatures less than 5° C. are not uncommon in water depths greater than 2,000 ft. The operating conditions of the well site are superimposed on FIG. 1. The temperature of the water in which the malfunction occurred was approximately 3° C.

Figure 2:
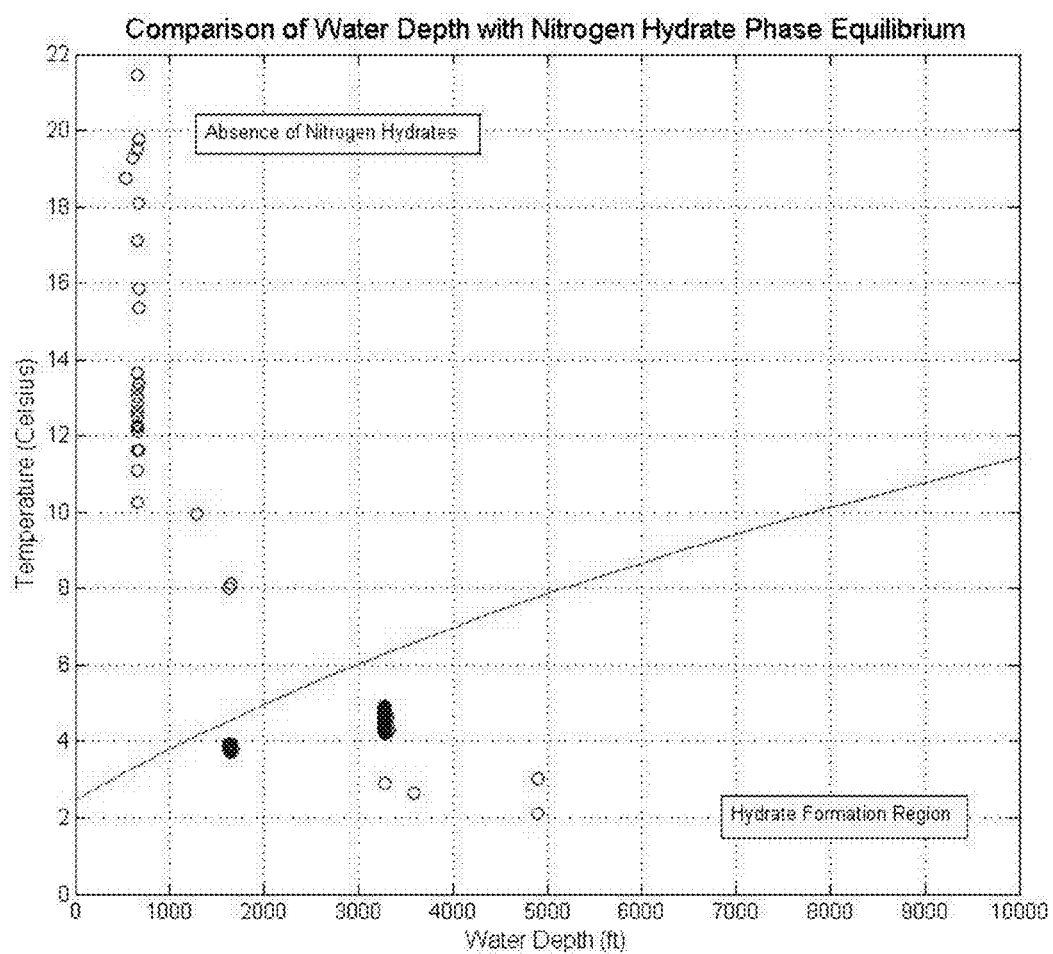
FIG. 2 is a graph of ocean temperature as a function of water depth, with a superimposed nitrogen hydrate phase equilibrium boundary line. The area below the diagonal line represents conditions that are favorable for nitrogen hydrate formation.

In FIG. 2, a nitrogen hydrate phase equilibrium boundary line is superimposed on a graph of ocean temperature as a function of water depth. The area below the line represents conditions that are favorable for nitrogen hydrate formation. The area above the line represents conditions that are not favorable for the formation of nitrogen hydrates. FIG. 2 shows that conditions are favorable for hydrate formation in water depths as shallow as 1,800 ft. Recognition of this phenomenon has gone unrecognized for many years. This may be explained by lack of information concerning the status of the BOP control system fluid and operating conditions relatively near the phase equilibrium boundary, which would have a long gas hydrate formation period.

Figure 3:
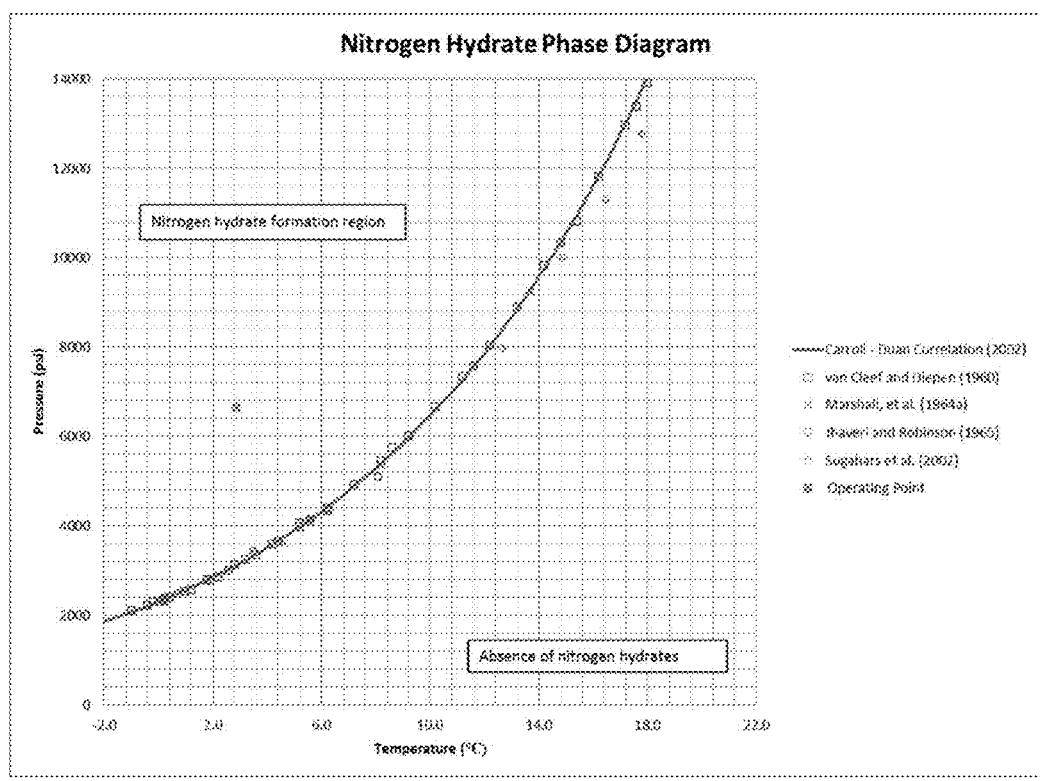
FIG. 3 is graph illustrating a nitrogen hydrate phase diagram. The fitted hydrate phase equilibrium line separates conditions that favor the formation of nitrogen hydrates from conditions that do not favor the formation of nitrogen hydrates. The Carroll-Duan correlation line is fitted to various data points obtained from the literature. A BOP control system operating condition is superimposed (Operating Point, filled square). The BOP operating point is located within the temperature-pressure region that favors nitrogen hydrate formation.

FIG. 3 is graph illustrating a nitrogen hydrate phase diagram. The fitted phase equilibrium boundary line separates conditions that favor the formation of nitrogen hydrates from conditions that do not favor the formation of nitrogen hydrates. The Carroll-Duan correlation line is fitted to various data points obtained from the literature. Conditions at colder temperatures and higher pressures will provide more impetus for hydrate formation and thus reduce the time it takes to form. A BOP control system operating condition is superimposed (Operating Point, filled square). The BOP operating point is located within the temperature-pressure region that favors nitrogen hydrate formation.

In order to re-create the gas hydrate formation events, experiments were performed to simulate the conditions during the BOP control system malfunction. The effects of salt (deionized water vs. rig potable water), fluid concentrate additive, and additional additives on nitrogen hydrate formation were examined. The experiments demonstrated the formation of gas hydrates at various pressure, temperature, and BOP control system hydraulic fluid combinations. Two exemplary BOP control system hydraulic fluid additives used in the experiments described herein are Fluid A and Fluid B.

Figure 4:
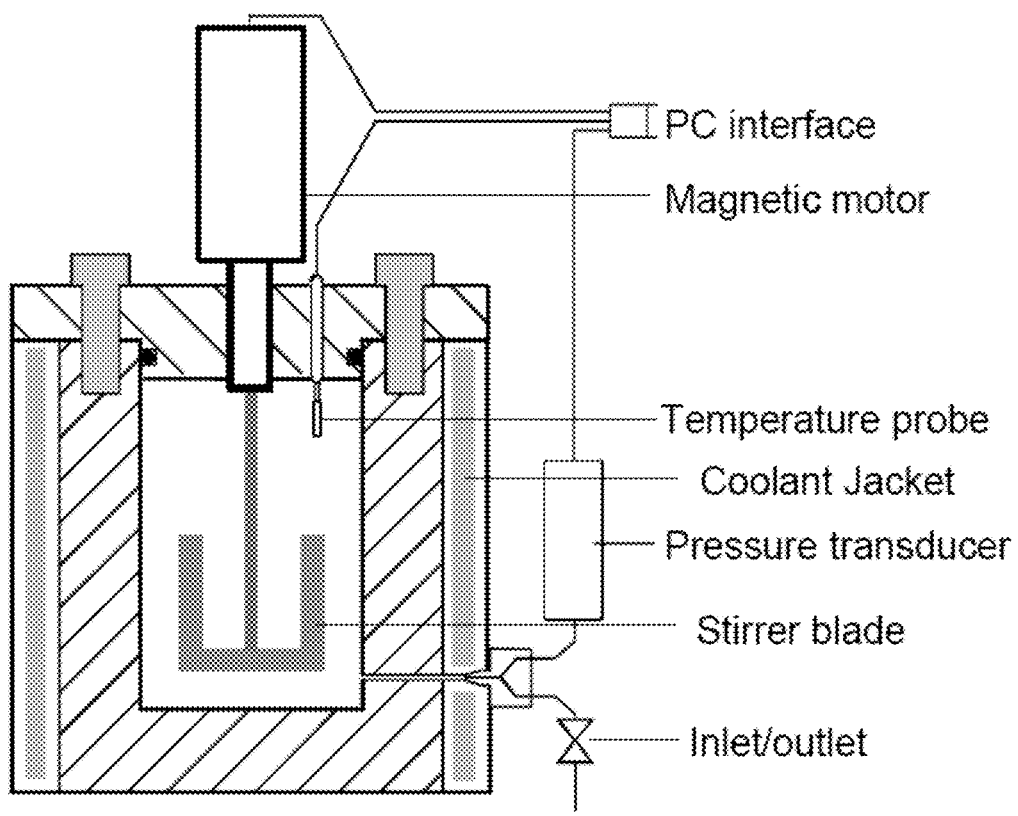
FIG. 4 is a schematic of the high pressure autoclave test cell employed in the experiments.

The experiments utilized a high pressure autoclave test cell (FIG. 4) custom built for the express purpose of gas hydrate formation studies. The fluid mixture in the test cell is accurately pressurized and temperature controlled. Temperature probes and pressure transducer monitor the conditions of the test cell and a magnetic motor spins an agitator at up to 1500 rpm to ensure the fluid mixture is well mixed.

Figure 5:
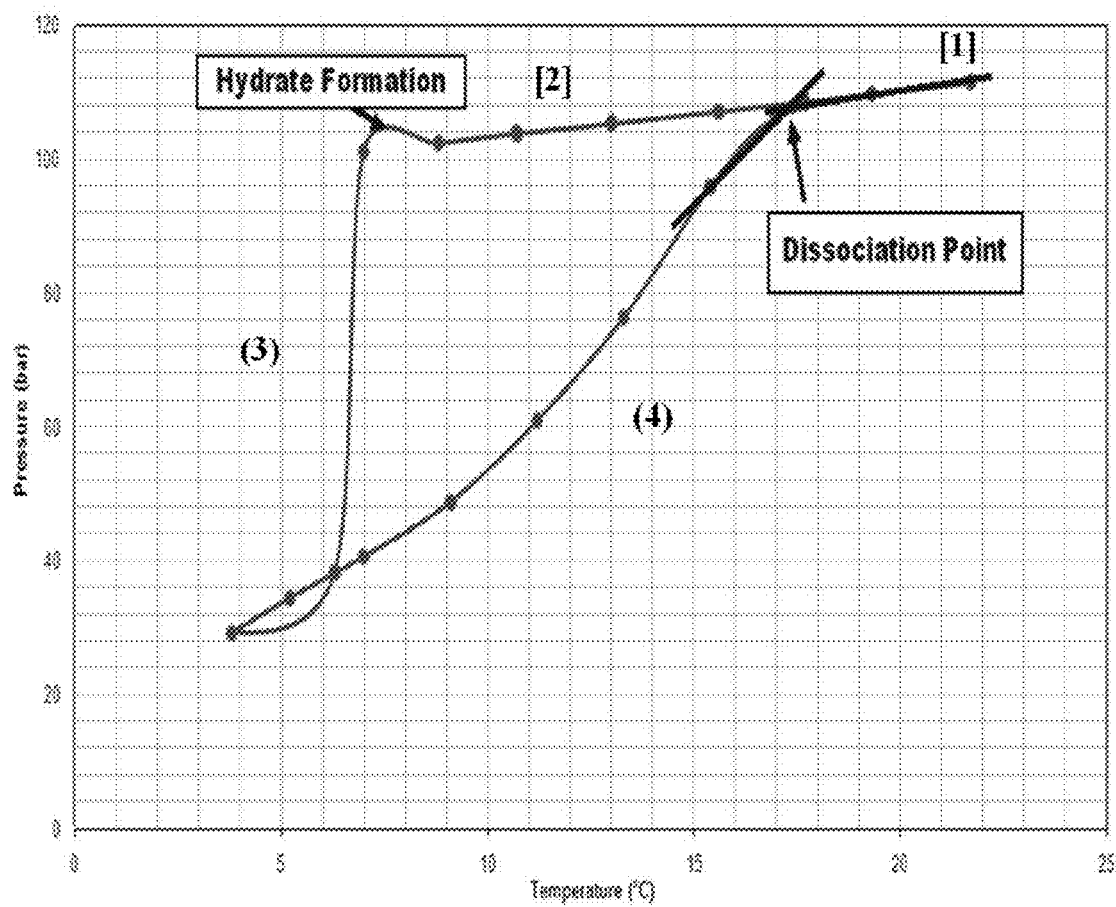
FIG. 5 is a graph of experimental results for the nitrogen hydrate testing. The proposed hydrate formation and dissociation point are derived from isochore tests.

The phase equilibrium point of the nitrogen hydrate is determined based on the isochoric step-heating method (Tohidi, et al. 2000). In this method, the cell is charged with the test fluids and pressurized to the desired starting pressure. The temperature is then lowered to form gas hydrates (FIG. 5), growth being detected by an associated drop in the cell pressure (as gas becomes trapped in hydrate structures). The cell temperature is then raised step-wise (~1° C. steps), allowing enough time at each temperature step for equilibrium to be reached. At temperatures below the point of complete dissociation, gas is released from decomposing gas hydrates, giving a marked rise in the cell pressure with each temperature step. However, once the cell temperature has passed the final gas hydrate dissociation point, and all gas hydrates have disappeared from the system, a further rise in the temperature will result only in a relatively small pressure rise due to thermal expansion. This process results in two traces with different slopes on a pressure versus temperature (P/T) plot, one before and one after the dissociation point. The point where these two traces intersect (i.e., an abrupt change in the slope of the P/T plot) is taken as the dissociation point and the location of the phase equilibrium boundary. For iso-chore tests, the temperature of the system is decreased in defined steps continuously up to the moment that the gas hydrates are starting to form—see point [1] in FIG. 5. Gas hydrate formation can be identified by a small increase and then a sudden big decrease in pressure [2]. Then, after the gas hydrates finished forming, see point [3] the sample will be heated up, point [4], in order to see the gas hydrate dissociation.

Figure 6:
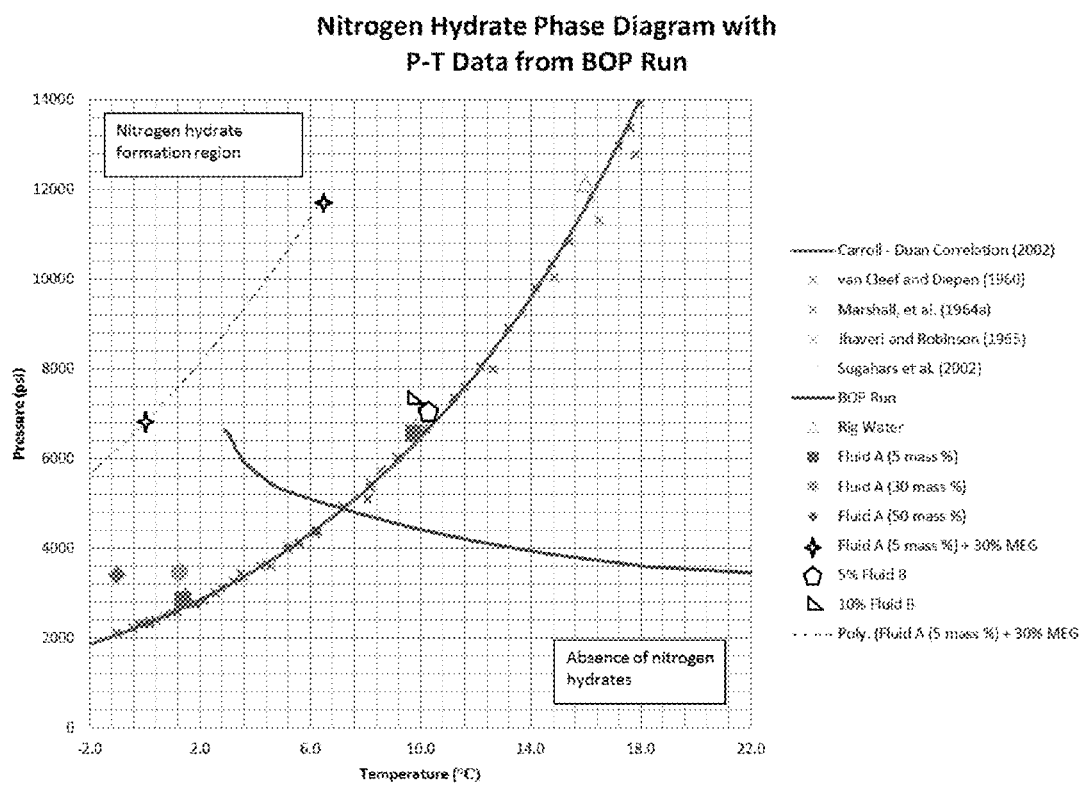
FIG. 6 is a graph illustrating a nitrogen hydrate phase diagram and includes data points for customary hydraulic fluids and presently-described compositions.

The experimental testing determined the phase equilibrium boundary for nitrogen hydrates of several fluids and the results are illustrated in FIG. 6. These fluids are as follows:

Nitrogen+Distilled Water;
Nitrogen+Rig Potable Water;
Nitrogen+Rig Potable Water+5% Fluid A;
Nitrogen+Rig Potable Water+30% Fluid A;
Nitrogen+Rig Potable Water+50% Fluid A;
Nitrogen+Rig Potable Water+5% Fluid A+30% Mono Ethylene Glycol;
Nitrogen+Rig Potable Water+5% Fluid B; and
Nitrogen+Rig Potable Water+10% Fluid B.

The nitrogen hydrate formation experiments conducted with rig potable water show a small change due to the dissolved salt concentrations. However, this effect is negligible in the prevention of hydrate formation. The addition of 5%, and 10% by mass of BOP fluid additives A and B to the rig potable water produced a small shift in the nitrogen hydrate phase equilibrium point. These two different BOP fluid additive concentrations investigated produced a similar effect, and any difference between the two is not discernible in this study.

Addition of 30% and 50% Fluid A, FIG. 6 filled circle and filled diamond, respectively, shifted the nitrogen hydrate phase equilibrium point to lower temperatures at a given pressure. However, the shift was not sufficient to prevent hydrate formation at the operating conditions.

A BOP fluid consisting of rig potable water+5% Fluid A+30% monoethylene glycol produced a temperature reduction in the phase equilibrium boundary of approximately 10° C. at two different pressures. The addition of 30% monoethylene glycol shifts the phase equilibrium boundary, FIG. 6 dotted line, such that the resulting BOP fluid can be subjected to lower temperatures and higher pressures without forming gas hydrates. Similar results were observed for the addition of propylene glycol and glycerol.

Figure 7:
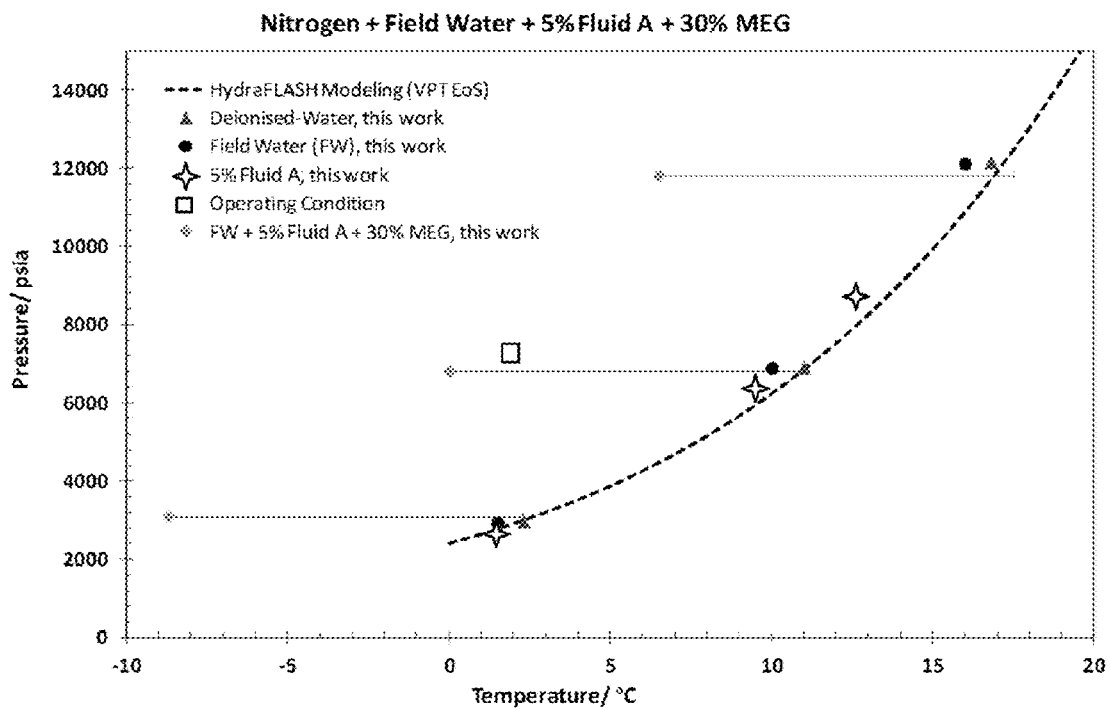
FIG. 7 is a table and corresponding graph of nitrogen hydrate dissociation point measurements in the field water (FW), deionized water, 5 mass % Fluid A in water, and 5 mass % Fluid A+30 mass % MEG in water.

FIG. 7 illustrates experimental hydrate dissociation points for nitrogen gas hydrates in the presence of Field Water+5 mass % Fluid A+30 mass % monoethylene glycol. Experimental data generated earlier in this project are shown for comparison. Predicted hydrate phase boundary (dotted line, using HydraFLASH) is also presented. As shown in FIG. 7, the operating condition is outside the hydrate stability zone with around 2° C. safety margin. This experiment demonstrates that by adding 30 mass % MEG to the system (i.e., Field Water+5 mass % Fluid A) the hydrate phase boundary shifts by around 11° C. compared to that of deionized water, thereby making the resulting system safe for field use.

Gas hydrate formation requires the right conditions to form, and time is one of the variables which influences gas hydrate formation. The further the well operating condition is from the phase equilibrium line into the hydrate formation region, the faster the gas hydrate will form. Furthermore, fluid agitation reduces the time necessary for gas hydrate formation. One test may take days to run, and several tests are necessary to provide insight into the kinetic behavior of the hydrate.

Figure 8:
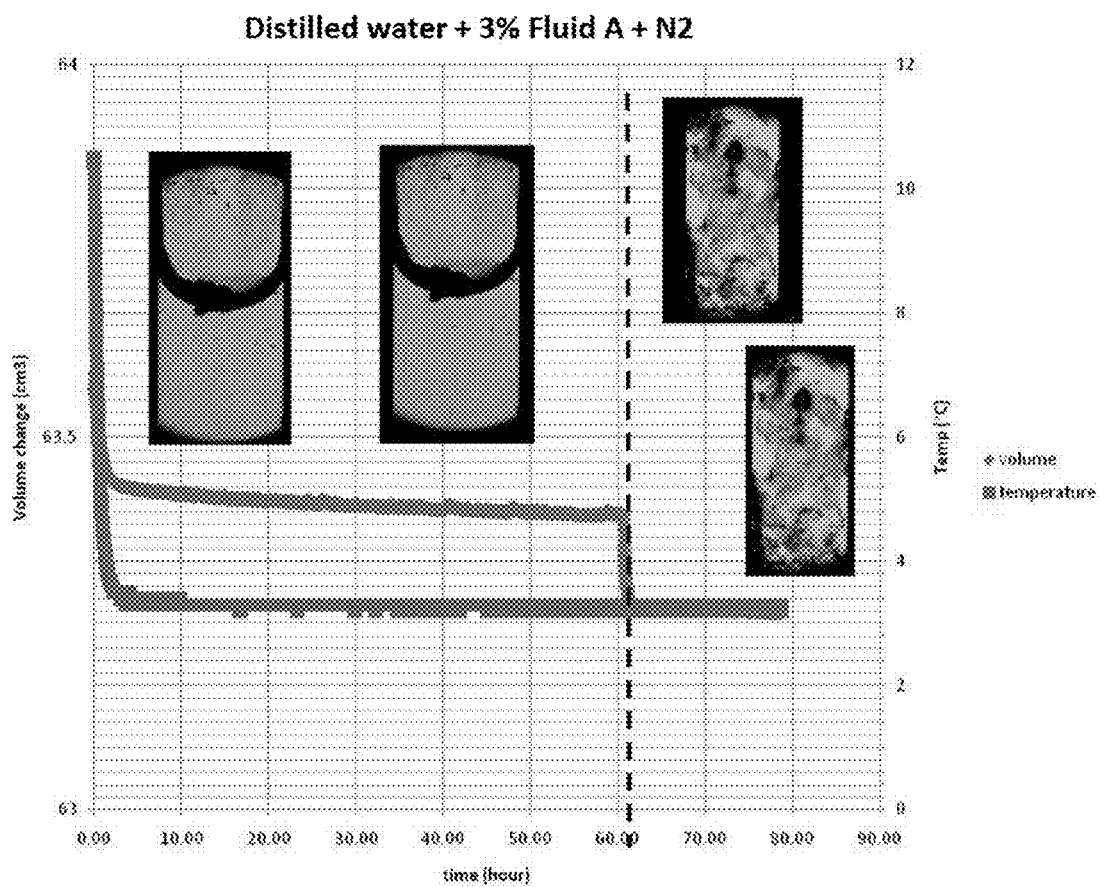
FIG. 8 is a graph demonstrating kinetic behavior of a 3% Fluid A+distilled water fluid at 3° C. and 5,000 psig.

The kinetic behavior, or time for gas hydrate formation was evaluated in one experiment. FIG. 8 shows the time necessary for a 3% Fluid A+distilled water at 3° C. and a constant pressure of 5,000 psig to form a nitrogen hydrate. Once the fluid was at the test conditions it took approximately 60 hours for the hydrate to form. It is expected that as the operating condition nears the phase equilibrium boundary, the amount of time required for hydrate formation will increase. The variability at different conditions is not known, but it demonstrates the long times required to form hydrates in some cases.

A number of correlations have been presented to calculate the stability zones for nitrogen gas hydrates (Carroll, Sloan, et al., and Tohidi, et al.). The experiments provided results consistent with that provided by others. The determination of the phase equilibrium point for nitrogen+distilled water based on the equipment measurements agrees well with the same information from van Cleef, Marshal, and others presented in FIG. 3. Therefore, good confidence exists in the ability of the equipment to produce accurate and real results.

Figure 9:
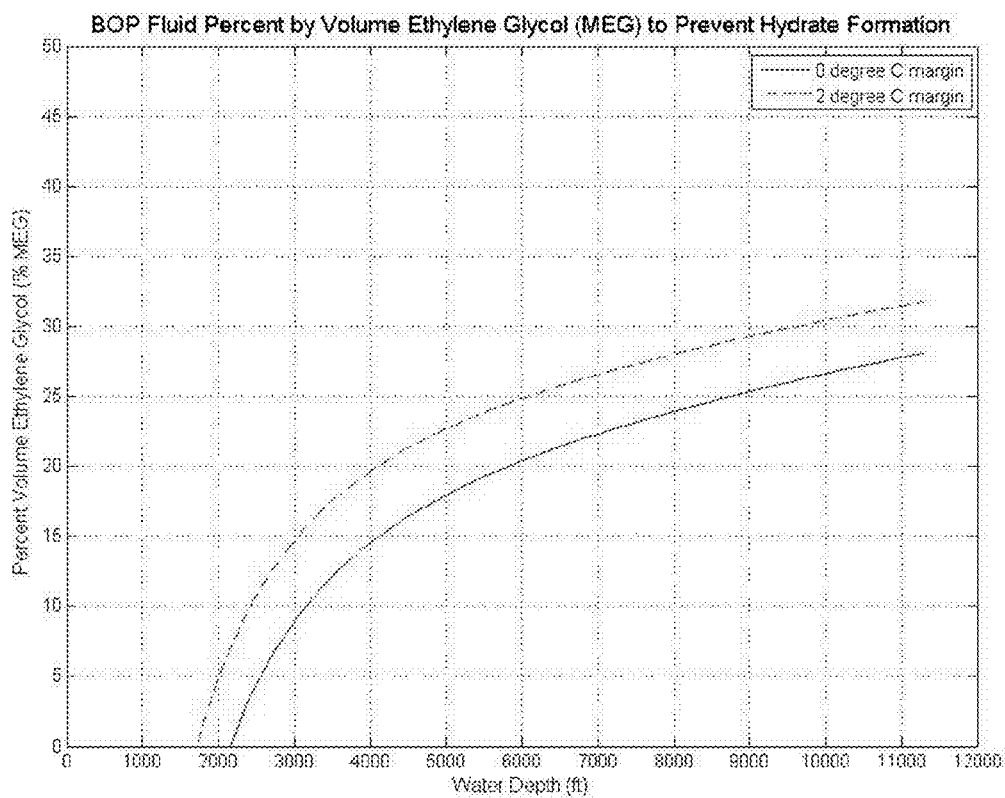
FIG. 9 is a graph illustrating the percent volume of glycol employed to prevent hydrate formation for a 3,000 psig system pressure at the given water depths. The internal system control pressure is 3,000 psi+the hydrostatic pressure of the seawater above it.
Figure 10:
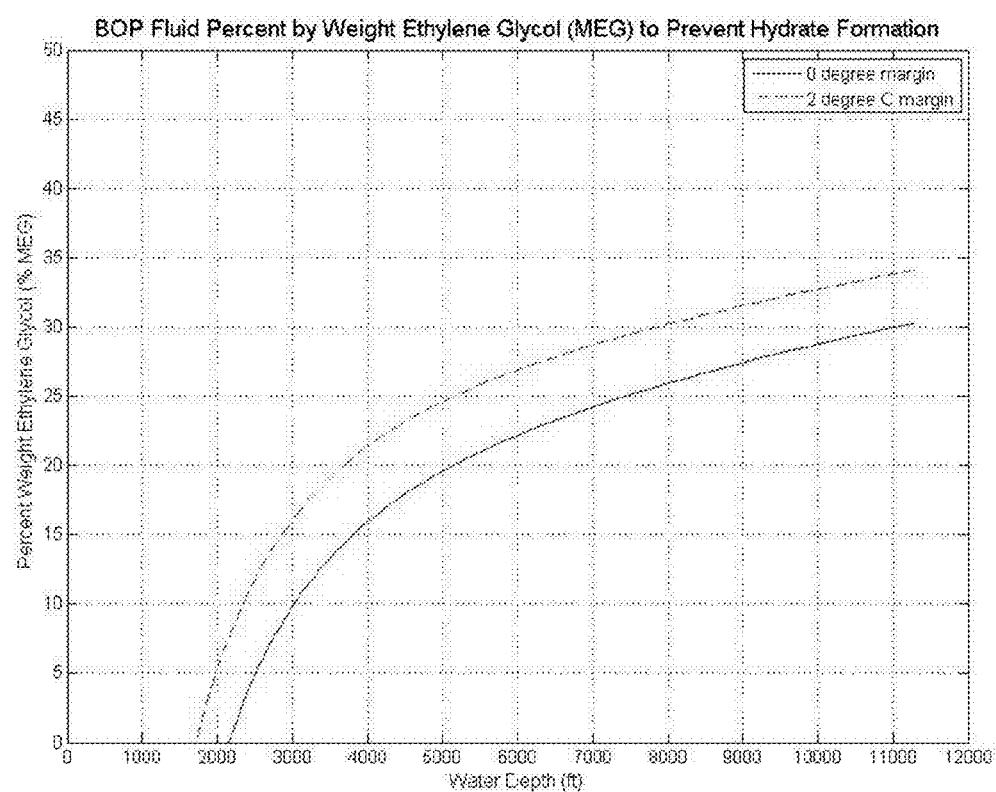
FIG. 10 is a graph illustrating the percent weight of glycol needed to prevent hydrate formation.

A correlation can be made between the operating water depth and the required volume of glycol to prevent the formation of nitrogen hydrates in the control system. FIG. 9 illustrates the relationship for a 3,000 psig control system pressure with 0° C. and 2° C. margin. FIG. 10 provides the same information as a weight percentage to determine how well the correlation compares with the experimental data.

Mitigation strategies can also be developed to prevent hydrates from forming in the BOP control fluid. These mitigation strategies include: Verification of stack mounted accumulator seals on the BOP; addition of 28% by volume of an alcohol to BOP fluid; addition of another inhibitor which may require hardware modifications to the BOP; use of argon, helium or neon as the accumulator working gas in lieu of nitrogen; and monitoring of the BOP control system to determine if a leak has occurred and initiate a countdown.

Most of the mitigation strategies developed have one or more significant issues that must be resolved for implementation. Addition of 28% by volume of an alcohol to the BOP fluid will shift the hydrate phase equilibrium line to the point where the operating conditions will not form a hydrate. This has been verified by testing and modeled successfully. However, this volume of glycol may not be acceptable for discharge to the environment.

Monoethylene glycol, propylene glycol, glycerol, methanol, or combinations thereof can be used. However, methanol is incompatible with some sealing materials and would require an engineering study and testing before implementation.

Argon, helium or neon form hydrates at higher pressures/lower temperatures than nitrogen. Using either of these gases in the BOP accumulators will mitigate the issue of hydrate formation. However, the equipment must be configured and arranged for the rig to handle argon, helium or neon. There is also a cost increase associated with using these gases in the system.

Nitrogen hydrates cannot form in the absence of nitrogen. Therefore, an effective strategy in dealing with nitrogen hydrates is ensuring that the BOP accumulators do not leak nitrogen into the control system. A system of checks and tests should be developed to ensure that the operational BOP does not have nitrogen leaks into the control system.

As stated above, the ice-like substance observed is a nitrogen hydrate formed by the leakage of nitrogen into the BOP control system. This assertion was corroborated by research into the literature concerned with hydrate formation as well as independent testing. The formation of solid hydrates in the control system is consistent with the loss of control of the BOP, lack of evidence at the surface conditions, observed formation at the subsea conditions, and evidence gathered concerning the damaged accumulator seals of the unit.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

BIBLIOGRAPHY

Carrol, John. *Natural Gas Hydrates: A Guide for Engineers*. Oxford: Elsevier, 2009.

McPhaden, Mike. "NODC Data Documentation Form." *National Oceanic Data Center*. Dec. 14, 1999. http://www.nodc.noaa.gov/archive/arc0001/0000003/1.1/data/0-data/ (accessed Dec. 7, 2012).

Moran, Michael J., and Howard N. Shapiro. *Fundamentals of Engineering Thermodynamics*. New York: John Wiley & Sons, Inc., 2000.

Sander, R. *NIST Standard Reference Data—Nitrogen*. 2011. http://webbook.nist.gov/cgi/cbook.cgi?ID=C7727379&Units=SI&Mask=10#copyright (accessed Dec. 6, 2012).

Sloan, E. Dendy, and Carolyn A. Koh. *Clathrate Hydrates of Natural Gases*. Boca Raton: CRC Press, 2008.

Span, Roland, Eric W. Lemmon, Richard T. Jacobsen, Wolfgang Wagner, and Akimichi Yokozeki. "A Rerence Equation of State for the Thermodynamic Properties of Nitrogen for Temperatures from 63.151 to 1000 K and Pressures to 2200 MPa." *Journal of Physical Chemistry Reference Data* 29, no. 6 (2000): 1361-1433.

Tohidi, B., R. W. Burgass, A. Danesh, K. K. Ostergaard, and A. C. Todd. "Improving the Accuracy of Gas Hydrate Dissociation Point Measurements." *Annals of the New York Academy of Science,* 2000: 912-924.

Wagner, W., and A. Pruβ. "The IAPWS Formulation 1995 for the Thermodynamic Properties of Ordinary Water Substance for General and Scientific Use." *Journal of Physical Chemistry Reference Data* 31, no. 2 (2002): 387-535.

What is claimed is:

1. A method for preventing formation of a gas hydrate in a BOP fluid in deep water well operations comprising the step of adding 28% to 35% by volume of an alcohol to the BOP fluid to form a nitrogen hydrate-resistant BOP fluid, wherein the BOP fluid is resistant to formation of nitrogen hydrates at a temperature of 2° C. or less and a pressure greater than 2000 psi.

2. The method of claim 1, wherein the alcohol is selected from the group consisting of monoethylene glycol, propylene glycol, glycerol, methanol, and a mixture thereof.

3. The method of claim 1, wherein a temperature reduction is produced in a nitrogen hydrate phase equilibrium boundary of approximately 10° C. for a given pressure.

4. The method of claim 1, wherein the BOP fluid comprises about 5% by volume of a fluid additive and at least 65% by volume of water.

5. The method of claim 4, wherein the additive is selected from a group consisting of one or more salts, lubricity components, mineral oils, vegetable oils, synthetic hydrocarbon oils, synthetic silicon-based oils, phospholipids, and mixtures thereof, antifreeze components, anti-corrosion components, bacterial and/or fungal growth inhibitors, elastomer compatibility components, pour point components, viscosity components, pH components, and combinations thereof.

6. The method of claim 4, wherein the water comprises deionized water, sea water, rig potable water, and combinations thereof.

7. A method for preventing formation of a gas hydrate in BOP fluid in deep water well operations comprising:
    verifying stack mounted accumulator seals on a BOP;
    adding 28% to 35% by volume of an alcohol to the BOP fluid, wherein addition of the 28% to 35% by volume of alcohol inhibits nitrogen hydrate formation; and
    monitoring the BOP control system to determine if a leak has occurred and initiate a countdown.

8. The method of claim 7, further comprising replacing nitrogen with helium, neon, or argon as the accumulator working gas.

9. A hydrate-resistant BOP fluid for deep water well operations, comprising:
    28% to 35% by volume of an alcohol;
    at least 5% by volume of a fluid additive; and
    balance of water,
    wherein the BOP fluid is nitrogen hydrate resistant.

10. The hydrate-resistant BOP fluid of claim 9, wherein the alcohol is selected from the group consisting of monoethylene glycol, propylene glycol, glycerol, methanol, and a mixture thereof.

11. The hydrate-resistant BOP fluid of claim 9, wherein a nitrogen hydrate phase equilibrium boundary of the nitrogen hydrate-resistant BOP fluid is approximately 10° C. less for a given pressure than a nitrogen hydrate phase equilibrium boundary of a BOP fluid without 28% to 35% by volume of the alcohol.

12. The hydrate-resistant BOP fluid of claim 9, wherein the fluid additive comprises one or more salts, lubricity components, mineral oils, vegetable oils, synthetic hydrocarbon oils, synthetic silicon-based oils, phospholipids, and mixtures thereof, antifreeze components, anti-corrosion components, bacterial and/or fungal growth inhibitors, elastomer compatibility components, pour point components, viscosity components, pH components and any combination thereof.

13. The hydrate-resistant BOP fluid of claim 9, wherein the water comprises deionized water, sea water, rig potable water, and combinations thereof.

14. A hydrate-resistant BOP fluid for deep water well operations, consisting essentially of:
  30% to 35% by volume of an alcohol;
  5% by volume of a fluid additive; and
  balance being water,
  wherein the fluid is nitrogen hydrate resistant.

15. The hydrate-resistant BOP fluid of claim 14, wherein the alcohol is selected from the group consisting essentially of: monoethylene glycol, propylene glycol, glycerol, methanol, and a mixture thereof.

16. The hydrate-resistant BOP fluid of claim 14, wherein the fluid additive is selected from a group consisting essentially of: one or more salts, lubricity components, mineral oils, vegetable oils, synthetic hydrocarbon oils, synthetic silicon-based oils, phospholipids, and mixtures thereof, antifreeze components, anti-corrosion components, bacterial and/or fungal growth inhibitors, elastomer compatibility components, pour point components, viscosity components, pH components and any combination thereof.

* * * * *